Patented July 10, 1951

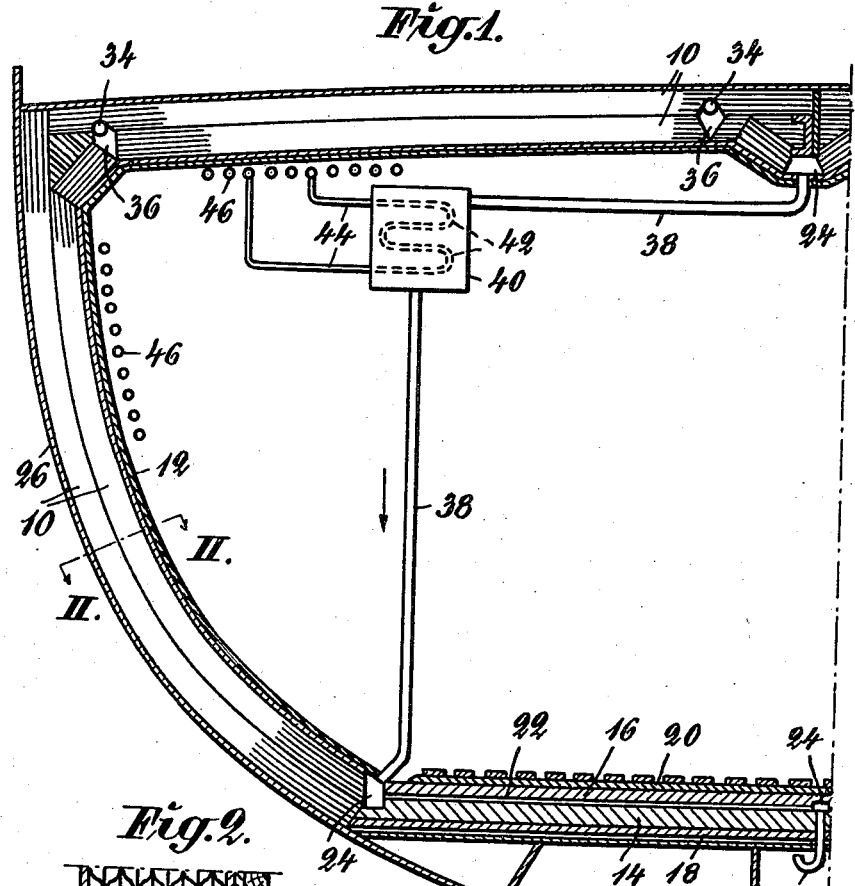
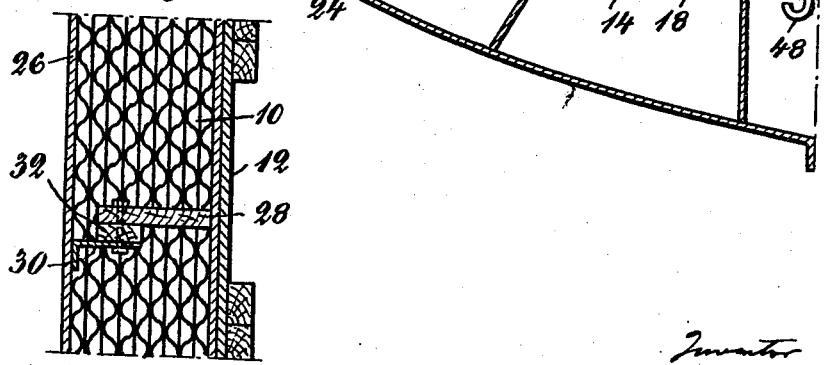

2,560,269

UNITED STATES PATENT OFFICE 2,560,269

INSULATED WALL AND ROOM

Erling Berner, Goteborg, Sweden, assignor to Isoleringsaktiebolaget WMB, Goteborg, Sweden, a corporation of Sweden Application November 19, 1948, Serial No. 60,961
In Sweden November 21, 1947

1 Claim. (Cl. 169—2)

This invention relates to insulated walls of rooms and more particularly to walls of ships' rooms or holds. The invention is principally distinguished by the provision of channels or passages within the wall, said channels or passages communicating with conduits for a fire-extinguishing medium, in a manner such that in case of a fire a curtain of said medium is created within the wall to confine the penetration of the fire into the insulation. The channels or passages form a continuous system, so that the medium in consideration, such as water, is caused rapidly to spread over the threatened wall surfaces, said medium thus counteracting or preventing an attack on the insulating material by its fire-damping and cooling effect.

The insulating capacity or efficiency of this material depends on the amount of moisture in the insulation, the greater the moisture content the less being the efficiency of the material. The invention has its greatest practical value, if the channels or passages in the walls are at the same time adapted to be incorporated in a known manner in a ventilation system, through which pre-dried air is under normal conditions introduced into the wall to remove moisture or water collected therein. In addition to the ventilation system normally ensuring keeping of the moisture content of the insulation at a low level, the important advantage is ensured that the insulation is dried after the fire combating apparatus has been in operation. Thus the insulating properties of the material may be restored, and from the point of view of drying, stripping of the insulation will not be required after its having been flushed with water or other fluid for fire prevention purposes.

The invention will be described more in detail hereinafter with reference to the embodiment illustrated in the accompanying drawing by way of example, further features characteristic of the invention being then also set forth.

Fig. 1 is a cross-sectional view of a portion of a cold-storage room or hold of a ship, the walls of which room are provided with an arrangement according to the invention; and Fig. 2 is a sectional view on the line II—II of Fig. 1.

The heat insulation disposed in the walls of the room is in the present case at the sides of the ship and in the roof or deck formed by insulating layers 10 of the multi-ply type, which may consist of alternating plane and corrugated sheets of impregnated paper with the corrugations extending parallel in the individual plies. Advantageously, the paper is impregnated with an asphaltic or other bituminous material, but within the scope of the invention other impregnating materials, inclusive of materials of fire-resistant or fire-proof nature, may be employed. The plies are, at least adjacent the inner lining 12, which in known manner generally consists of a number of board layers, disposed in a manner such that the channels between the sheets extend athwartships in the roof and vertically at the sides of the ship, so that continuous channel systems are formed between the same. Boards 14, 16 of a porous material, such as cork, may be used in the floor, such boards resting on a bottom 18 and being covered by floor layers 20 in a manner known. The upper layer 16 is provided on the lower side thereof with relatively parallel slots 22 extending athwartships. At the junctures between the various insulating layers, for instance between the layers of the side of the ship and those of the floor, there are provided collecting channels 24, so that the channels and the slots communicate with each other on all sides. Provided in known manner at the sides of the ship are distance pieces between the hull 26 and the inner lining 12, said pieces being constructed from boards 28, flanges 30 and distance blocks 32 interconnecting the same. Said blocks are so disposed adjacent the collecting channels 24 that an open communication is provided along these channels in the longitudinal direction of the ship.

Pipes 34 are disposed in the insulation of the roof or deck, which is generally somewhat sloping from the middle of the ship toward the sides thereof, said pipes extending in the longitudinal direction of the ship and being provided with sprinkling apertures at the lower side thereof. These apertures open opposite longitudinally extending passages 36 in the insulating material.

The continuous channel system provided round all sides of the room, as above described, communicates with a device for the ventilation of the insulation, so that collection of moisture in the insulation is counteracted under normal conditions. In the embodiment shown, such device consists of pipes 38 connecting two points of the walls of the room with each other at different levels, said pipes opening in places where longitudinally extending collecting passages 24 are provided. Connected into the conduits 38 in the upper part of the room is a receptacle 40, which may contain a cooling coil 42, which is traversed by a cooling agent. As indicated, the coil is connected by means of conduits 44 to the refrigerating elements 46 that adjust the cold-storage room to the desired low temperature. A circulation of air is normally maintained through the walls of the room, the circulating air being cooled down during its passage through the receptacle 40 so as to become demoistened thereby. The air which enters the insulation of the room in this manner has been predried so as to be capable of absorbing moisture penetrating into said insulation. This continuous drying of the insulation has a favorable effect on the insulating capacity thereof, which would otherwise become impaired to a greater or small extent through the presence of moisture. The circulation, which is effected in the present case by the fact that the air columns in the system acting against each other have different temperatures and thus different specific weights, may be intensified by the incorporation of a fan.

In its simplest form, the drying means above described simply consists of openings at different levels in the cold-storage room. In the drawing, the drying means has only been illustrated diagrammatically, more detailed descriptions of such apparatus forming a part of the disclosure and claimed subject matter of U. S. Patent applications of Carl G. Munters, Serial Nos. 731,253, now Patent No. 2,485,630, granted October 25, 1949, and 761,682.

Now, should a fire break out in the cold-storage room, a fire-extinguishing or fire-damping fluid is introduced through the conduits 34, which fluid may be liquid or gaseous. In ships, water may be used to advantage, the same being supplied to the conduits by means of any of the pumps normally provided in the ship. The fluid in consideration is distributed within the channel system provided in the walls, and forms a kind of curtain or the like round the sides of the cold-storage room, and renders the penetration of the fire to the insulation difficult or impossible. In the floor there may be provided one or more drain pipes 48 shaped to provide or fitted with liquid seals, through which pipes the fluid escapes. By the fact that the channel system arranged in the walls communicates at the same time with a ventilation system, the important advantage is gained that the insulation may, after a fire has been combatted, be dried or relieved of the fire-extinguishing fluid without having to be stripped.

Obviously, the invention is not limited to the embodiment disclosed, but may be varied in many respects within the scope of the basic idea thereof. If the insulation does not itself show any spreading channels or passages, these may be arranged in the walls with the aid of distance pieces or the like. When walls are considered in connection with the invention, said word is to be interpreted so that it may also include the roof and the floor of the room.

What I claim is:

In an insulated room, wall structure comprising insulating material having a multiplicity of substantially vertical parallel channels extending therethrough, insulating material providing collecting channels extending transversely of the first mentioned channels and communicating with the upper and lower ends of the first mentioned channels, whereby to provide a channel system from which liquid is substantially entirely drainable by gravity, means providing a ventilating system for said walls including conduits connected with said collecting channels for circulating drying air through said channel system to absorb moisture from the insulating material and conduit means for supplying water to the upper part of said channel system to form a fire resistant curtain within said wall structure, and means communicating with substantially the lowest part of said channel system for draining water therefrom.

ERLING BERNER.

REFERENCES CITED

The following references are of record in the file of this patent:

UNITED STATES PATENTS

| Number | Name | Date |
| --- | --- | --- |
| 2,241,768 | Deremer | May 13, 1941 |
| 2,338,452 | Munters et al. | Jan. 4, 1944 |
| 2,485,630 | Munters | Oct. 25, 1949 |